US012212160B2

United States Patent
Moritomo

(10) Patent No.: US 12,212,160 B2
(45) Date of Patent: Jan. 28, 2025

(54) POWER TRANSMISSION APPARATUS, POWER RECEPTION APPARATUS, CONTROL METHOD PERFORMED BY POWER TRANSMISSION APPARATUS, CONTROL METHOD PERFORMED BY POWER RECEPTION APPARATUS, AND STORAGE MEDIUM

(71) Applicant: CANON KABUSHIKI KAISHA, Tokyo (JP)

(72) Inventor: Kazuo Moritomo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 17/885,427

(22) Filed: Aug. 10, 2022

(65) Prior Publication Data
US 2022/0385117 A1 Dec. 1, 2022

Related U.S. Application Data

(63) Continuation of application No. PCT/JP2021/002447, filed on Jan. 25, 2021.

(30) Foreign Application Priority Data

Feb. 13, 2020 (JP) ................................ 2020-022903

(51) Int. Cl.
*H02J 50/80* (2016.01)
*H02J 50/10* (2016.01)
*H02J 50/60* (2016.01)

(52) U.S. Cl.
CPC .............. *H02J 50/80* (2016.02); *H02J 50/10* (2016.02); *H02J 50/60* (2016.02)

(58) Field of Classification Search
CPC . H02J 50/80; H02J 50/10; H02J 50/60; H04B 5/79; H04B 5/24; H04B 5/48; G01R 19/165
See application file for complete search history.

(56) References Cited

U.S. PATENT DOCUMENTS 9,423,439 B2 * 8/2016 Jung .................. G01R 29/0814
2013/0076153 A1 * 3/2013 Murayama .............. H02J 50/12
307/104
(Continued)

FOREIGN PATENT DOCUMENTS

JP 2013017336 A 1/2013
JP 2013070580 A 4/2013
(Continued)

OTHER PUBLICATIONS

"The Qi wireless power transfer system power class 0 specification—Parts 1 and 2: Interface Definitions"; International Electrotechnical Commission; IEC PAS 63095-1; Edition 1.0; May 2017; Publicly Available Specification Pre-Standard; pp. 1-164.

*Primary Examiner* — Jared Fureman
*Assistant Examiner* — Michael J Warmflash
(74) *Attorney, Agent, or Firm* — Canon U.S.A., Inc. IP Division

(57) ABSTRACT

A power transmission apparatus 101 includes a communication unit 206 configured to wirelessly communicate with a power reception apparatus using an antenna, a power transmission unit 203 configured to wirelessly transfer power to the power reception apparatus using the antenna, a detection unit 204 configured to measure at least either a voltage or a current output from the antenna in a period where the transfer of the power is stopped and the communication by the communication unit 206 is not performed, and determine that there is an object different from the power reception apparatus based on the result of the measurement, and a control unit 201 configured to, if there is determined to be the object different from the power reception apparatus, restrict the transfer of the power.

10 Claims, 11 Drawing Sheets

(56) References Cited

U.S. PATENT DOCUMENTS

| | | | |
|---|---|---|---|
| 2015/0349541 A1* | 12/2015 | Yamamoto | H02J 50/402 |
| | | | 307/104 |
| 2016/0187519 A1* | 6/2016 | Widmer | G01V 3/10 |
| | | | 324/222 |
| 2016/0187520 A1* | 6/2016 | Widmer | G01V 3/10 |
| | | | 324/227 |
| 2017/0093214 A1* | 3/2017 | Watanabe | H02J 50/60 |
| 2019/0222066 A1* | 7/2019 | Kozakai | H02J 50/60 |
| 2019/0296590 A1* | 9/2019 | Chae | H02J 7/02 |
| 2022/0393516 A1* | 12/2022 | Shimura | H02J 50/12 |

FOREIGN PATENT DOCUMENTS

| | | |
|---|---|---|
| JP | 2013236422 A | 11/2013 |
| JP | 2016007124 A | 1/2016 |
| JP | 2016027788 A | 2/2016 |
| JP | 2017070074 A | 4/2017 |
| JP | 2018-512036 A | 4/2018 |
| JP | 2018117483 A | 7/2018 |
| JP | 2019004691 A | 1/2019 |
| KR | 20180025602 A | 3/2018 |

\* cited by examiner

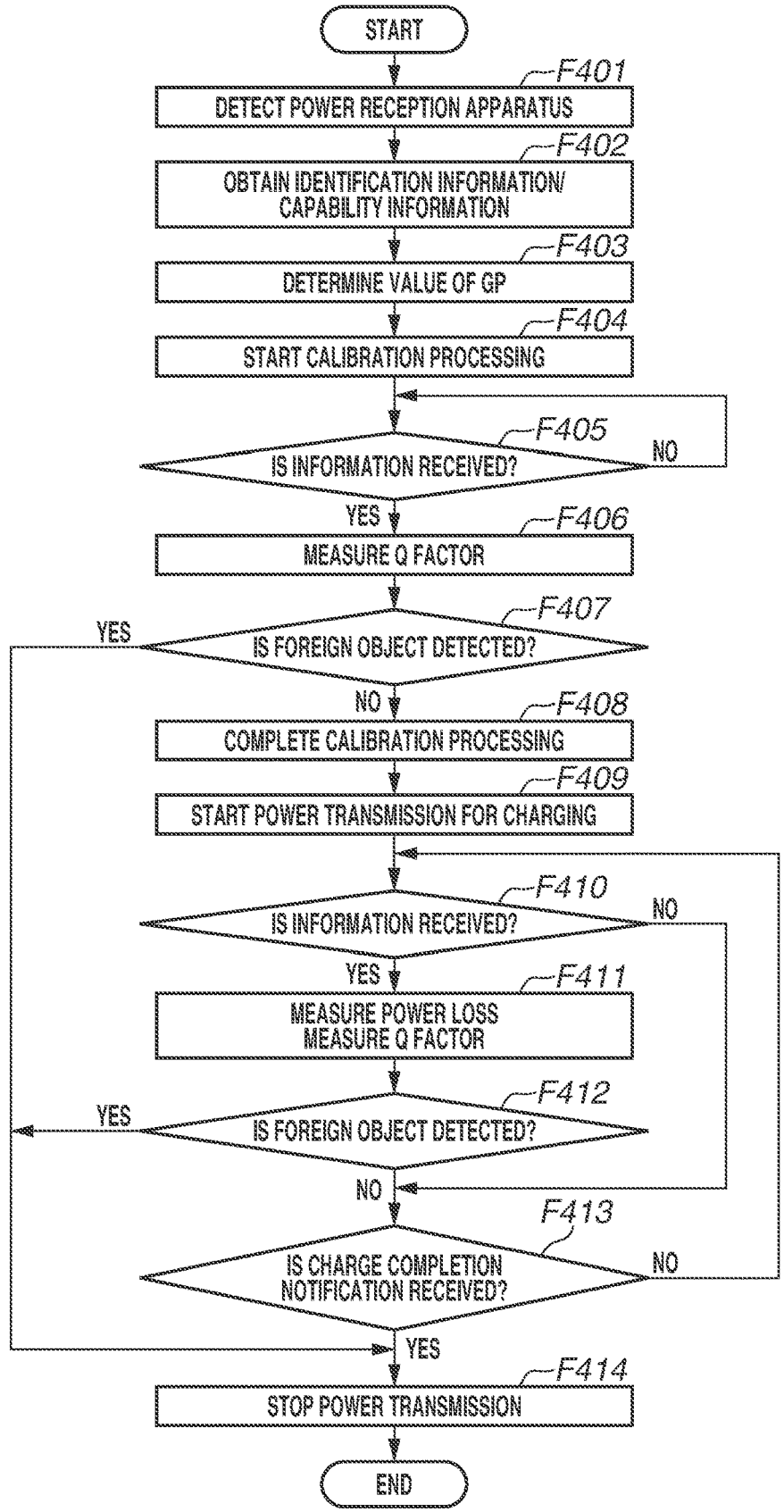

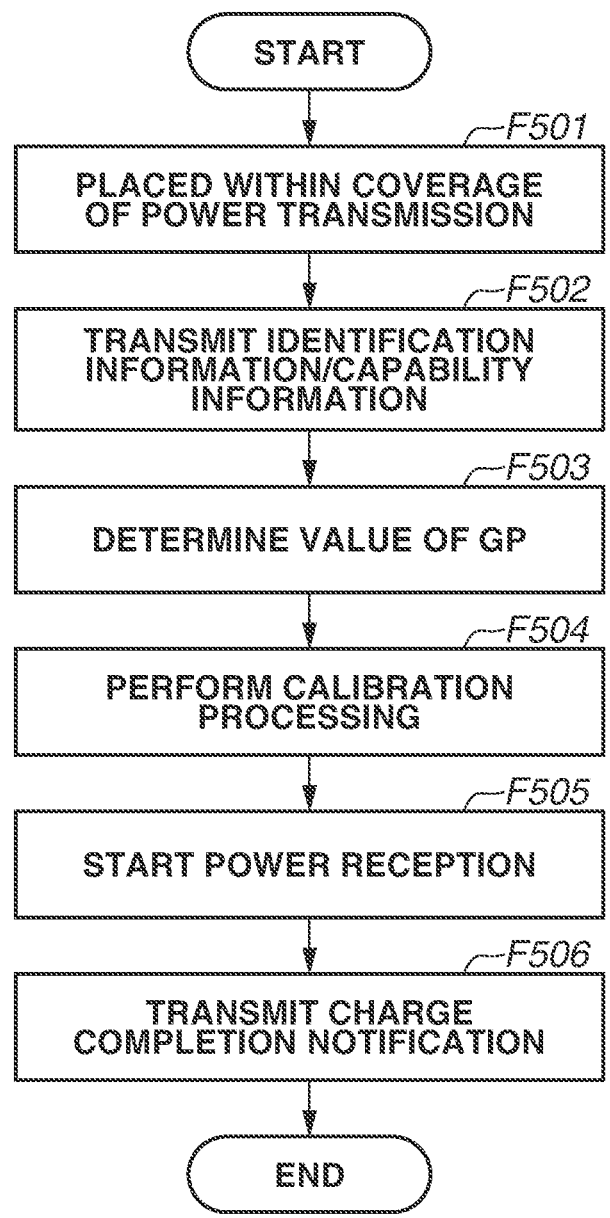

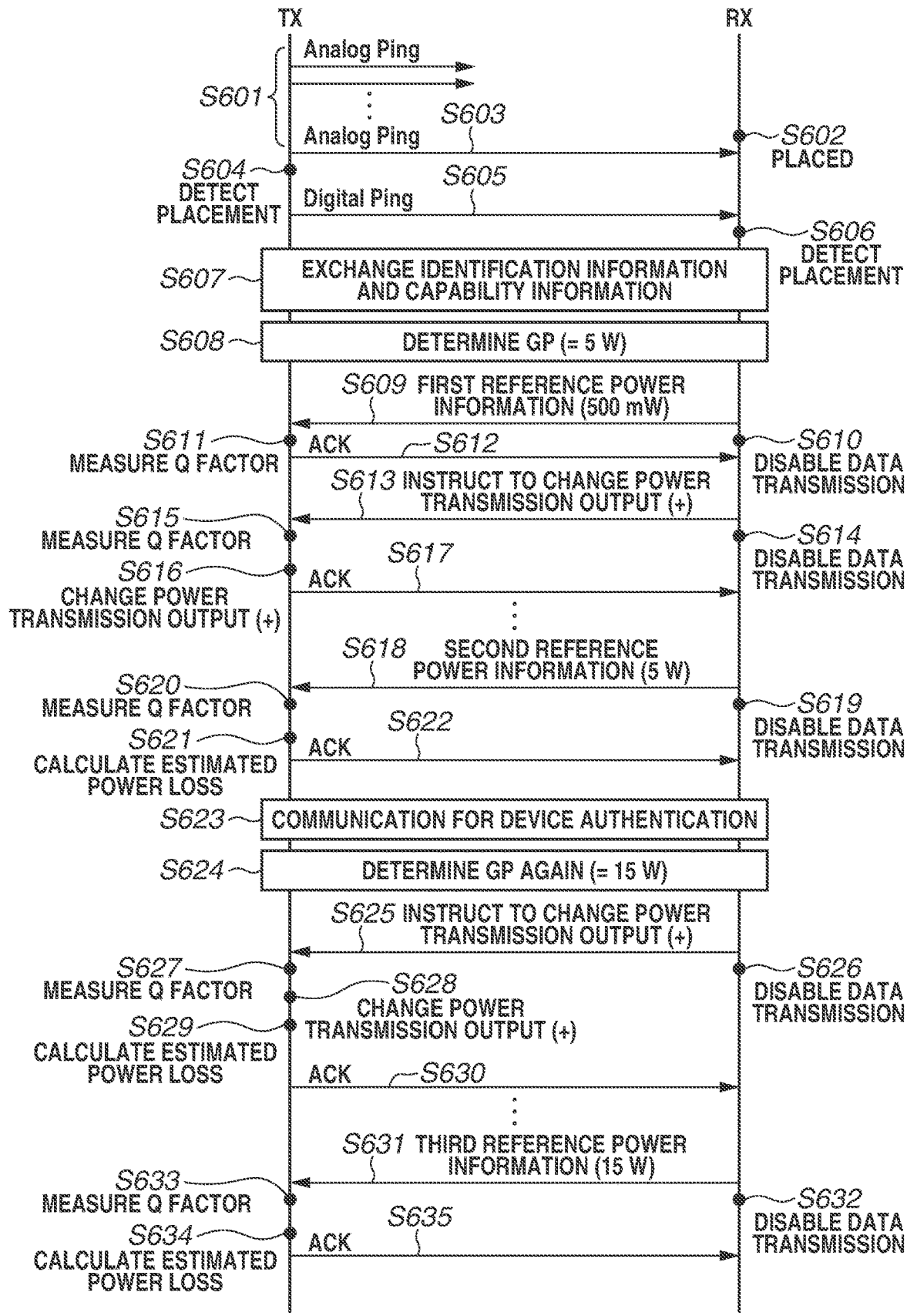

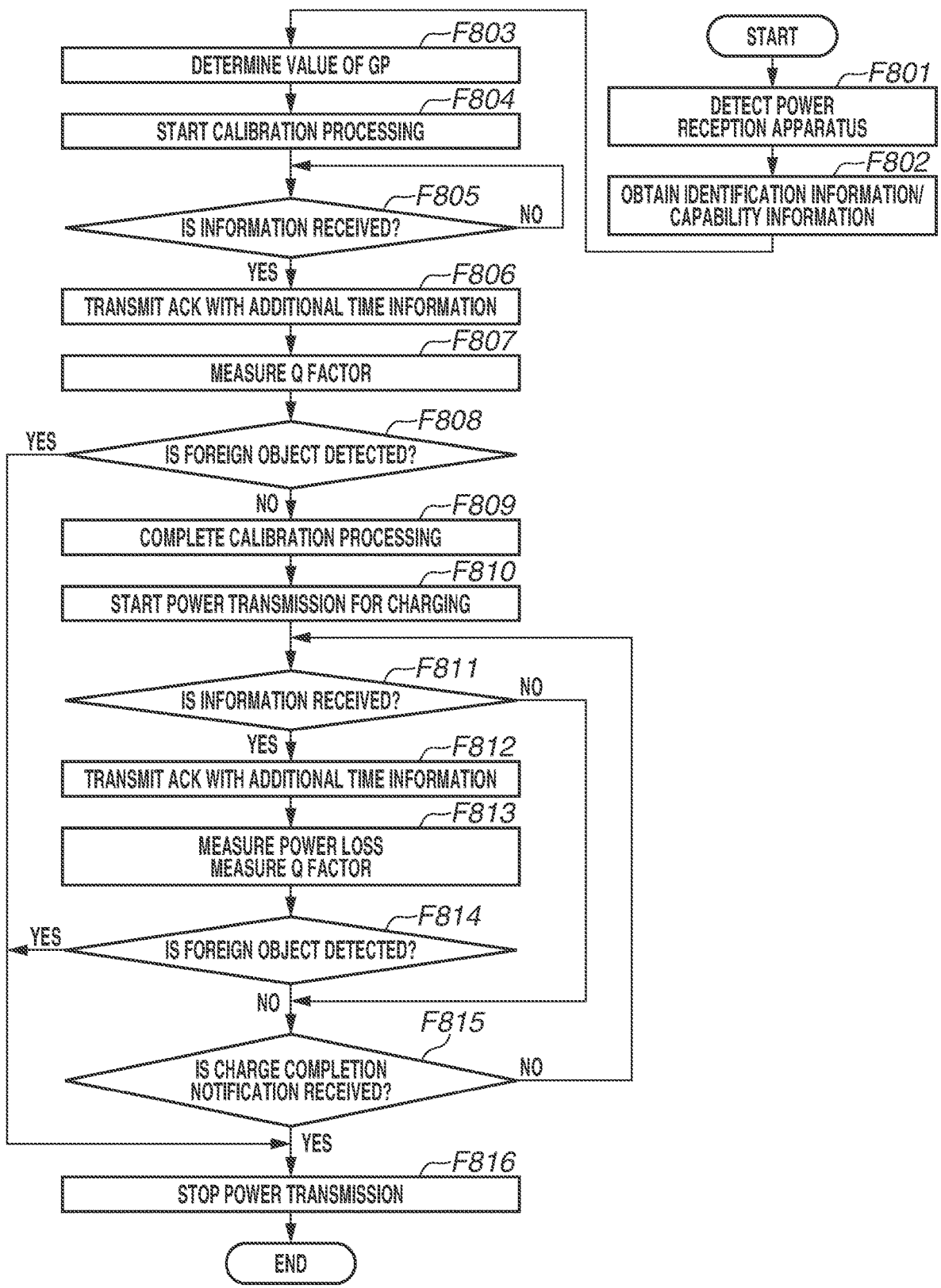

FIG.11

|     | $b_0$ | $b_1$ | $b_2$ | $b_3$ | $b_4$ | $b_5$ | $b_6$ | $b_7$ |
|-----|-------|-------|-------|-------|-------|-------|-------|-------|
| $B_0$ |  | \multicolumn{6}{c}{BIT STRING SPECIFYING ACK} | |
| $B_1$ | \multicolumn{8}{c}{BIT STRING SPECIFYING TIME INFORMATION} |

POWER TRANSMISSION APPARATUS, POWER RECEPTION APPARATUS, CONTROL METHOD PERFORMED BY POWER TRANSMISSION APPARATUS, CONTROL METHOD PERFORMED BY POWER RECEPTION APPARATUS, AND STORAGE MEDIUM

CROSS-REFERENCE TO RELATED APPLICATIONS

This application is a Continuation of International Patent Application No. PCT/JP2021/002447, filed Jan. 25, 2021, which claims the benefit of Japanese Patent Application No. 2020-022903, filed Feb. 13, 2020, both of which are hereby incorporated by reference herein in their entirety.

BACKGROUND

Field

The present disclosure relates to a power transmission apparatus and a power reception apparatus.

Background Art

Wireless power transfer system technologies have been widely developed in recent years. Patent Literature 1 discusses a power transmission apparatus and a power reception apparatus compliant with a standard formulated by the Wireless Power Consortium (WPC), a standards organization for wireless charging standards (hereinafter, referred to as WPC standard). Communication between the power transmission apparatus and the power reception apparatus is implemented by superposing signals on power being transferred, using the antennas used in the wireless power transfer.

Patent Literature 1 (described further below) discusses a method for identifying, in a case where there is an object different from the power reception apparatus (hereinafter, referred to as a foreign object) within a range where the power transmission apparatus can transfer power, the presence of the foreign object, and restricting the power transfer based on the identification result.

Patent Literature 2 (described further below) discusses a method for determining whether there is an object near a power transmitter based on the amount of attenuation in the voltage value of the power transmitter in a period where the voltage of the power transmitter decreases gradually after power transfer is stopped.

If antennas used in wireless power transfer are used for communication between the power transmission apparatus and the power reception apparatus, the method discussed in Patent Literature 2 gives rise to the following issue. If communication using the antennas used in wireless power transfer is performed in measuring the voltage in the period where the power transfer is stopped, the change in the amplitude of the signal is reflected on the power, i.e., the measured voltage. The measured voltage is thus affected not only by an object but by the communication as well. Determining the presence of an object based on the measured voltage thus causes a drop in the accuracy of the object detection. For example, an object that is present can fail to be detected. An object that is not there can be erroneously detected. If such a method is applied to foreign object detection, the detection accuracy of the foreign object can drop. This issue also occurs in the case of measuring a current.

CITATION LIST

Patent Literature

PTL 1: Japanese Patent Application Laid-Open No. 2017-70074

PTL 2: Japanese Unexamined Patent Application Publication No. 2018-512036

SUMMARY

The present disclosure has been achieved in view of the foregoing issue, and is directed to preventing a drop in the detection accuracy in the case where the foreign object detection is performed based on the measurement of the voltage or current in a period where the power transfer is stopped.

According to an aspect of the present disclosure, a power transmission apparatus includes a communication unit configured to wirelessly perform communication with a power reception apparatus using an antenna, a power transmission unit configured to wirelessly transfer power to the power reception apparatus using the antenna, a measurement unit configured to perform measurement of at least either a voltage or a current output from the antenna in a period where the power transmission unit stops transferring the power and the communication unit does not perform the communication, a determination unit configured to determine that there is an object different from the power reception apparatus based on a result of the measurement by the measurement unit, and a restriction unit configured to, in a case where the determination unit determines that there is the object different from the power reception unit, restrict transfer of the power by the power transmission unit.

Further features of the present disclosure will become apparent from the following description of exemplary embodiments with reference to the attached drawings.

BRIEF DESCRIPTION OF THE DRAWINGS

FIG. 4 is a flowchart for describing processing performed by the power transmission apparatus according to a first exemplary embodiment.

FIG. 5 is a flowchart for describing processing performed by the power reception apparatus according to the first exemplary embodiment.

FIG. 6 is a sequence diagram for describing an operation of the power transmission apparatus and the power reception apparatus according to the first exemplary embodiment.

FIG. 8 is a flowchart for describing processing performed by a power transmission apparatus according to a second exemplary embodiment.

FIG. 11 is a diagram illustrating an example of information transmitted by the power transmission apparatus according to the second exemplary embodiment.

DESCRIPTION OF THE EMBODIMENTS

Exemplary embodiments of the present disclosure will be described below with reference to the drawings. Components described in the following exemplary embodiments merely demonstrate examples of the exemplary embodiments of the present disclosure, and the present disclosure is not limited thereto.

First Exemplary Embodiment

Figure 1:
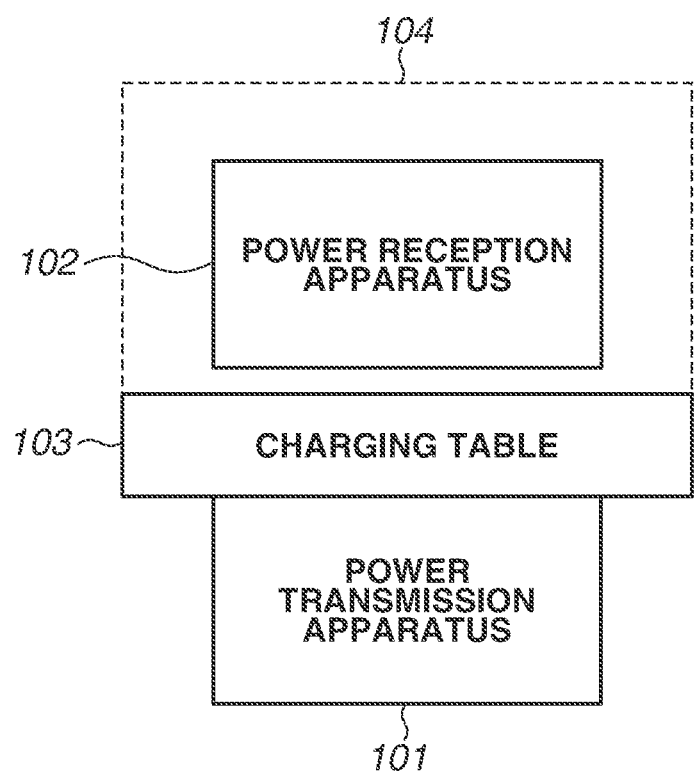
FIG. 1 is a diagram illustrating a configuration example of a wireless power transfer system.

FIG. 1 illustrates a configuration example of a wireless charging system (wireless power transfer system) according to the present exemplary embodiment. This system includes a power transmission apparatus 101 and a power reception apparatus 102, for example. The power reception apparatus may hereinafter be referred to as an RX, and the power transmission apparatus as a TX. The RX 102 is an electronic device that receives power from the TX 101 and charges its built-in battery. The TX 101 is an electronic device that wirelessly transmits power to the RX 102 placed on a charging table 103. The RX 102 can receive power within a range 104 from the TX 101. An example of the RX 102 is a smartphone. An example of the TX 101 is an accessory device for charging the smartphone. The RX 102 and the TX 101 may be storage devices such as a hard disk drive and a memory device, or information processing apparatuses such as a personal computer (PC). Examples of the RX 102 and TX 101 may also include image input apparatuses such as an imaging apparatus (camera or video camera) and a scanner, and image output apparatuses such as a printer, a copying machine, and a projector. The RX 102 and the TX 101 may have a function of executing applications different from a wireless charging application. The TX 101 may be a smartphone. In such a case, the RX 102 may be another smartphone or wireless earphones. The RX 102 may be a vehicle. TX 101 may be a charger installed on an console or the like in the vehicle.

While the present exemplary embodiment deals with one TX 101 and one RX 102, the present exemplary embodiment may be applied to a configuration where a plurality of RXs 102 receives power transmission from one TX 101 or respective different TXs 101.

The present system performs wireless power transfer using an electromagnetic induction method for wireless charging based on a standard for wireless charging defined by the Wireless Power Consortium (WPC) (WPC standard). In other words, the RX 102 and the TX 101 perform wireless power transfer for wireless charging based on the WPC standard between a power reception coil (power reception antenna) of the RX 102 and a power transmission coil (power transmission antenna) of the TX 101. Note that the wireless power transfer method is not limited to the method defined by the WPC standard, and other electromagnetic induction methods, magnetic resonance methods, electric field resonance methods, microwave methods, and methods using laser or the like may be used. While in the present exemplary embodiment the wireless power transfer is used for wireless charging, the wireless power transfer may be performed for uses different from wireless charging.

The WPC standard defines the magnitude of power guaranteed when the RX 102 receives power from the TX 101 as a value called guaranteed power (GP). The GP indicates the power value guaranteed to be output to a load (such as a charging circuit) in the RX 102 even if the power transfer efficiency between the power reception coil and the power transmission coil drops due to a change in the positional relationship between the RX 102 and the TX 101, for example. If, for example, the GP is 5 watts, the TX 101 controls power transmission so that 5 watts can be output to the load in the RX 102 even if the power transfer efficiency drops due to a change in the positional relationship between the power reception coil and the power transmission coil.

The RX 102 and the TX 101 according to the present exemplary embodiment perform communication intended for power transmission and reception control based on the WPC standard. The communication for power transmission and reception control will now be described. The WPC standard defines a plurality of phases including a power transfer phase where power transfer is executed, and phases before the execution of the power transfer. The phases before the execution of the power transfer include (1) a selection phase, (2) a ping phase, (3) an identification and configuration phase, (4) a negotiation phase, and (5) a calibration phase. The identification and configuration phase will hereinafter be referred to as an I&C phase.

(1) In the selection phase, the TX 101 intermittently transmits an analog ping to detect that there is an object within the coverage of power transmission (for example, that the reception apparatus 102 or a conductor piece is placed on the charging table 103). In other words, the analog ping is a detection signal for detecting the presence of an object. The TX 101 transmits the analog ping by applying a voltage or current to the power transmission coil. The voltage or current applied to the power transmission coil varies between when an object is placed on the charging table 103 and when no object is placed. The TX 101 then detects at least either one of a voltage value and a current value of the power transmission coil when transmitting the analog ping. If the voltage value falls below a threshold or the current value exceeds a threshold, the TX 101 determines that there is an object, and transitions to the ping phase.

(2) In the ping phase, the TX 101 transmits a digital ping having power higher than the analog ping. The power of the digital ping is sufficient to activate a control unit of the RX 102 placed on the charging table 103. The RX 102 notifies the TX 101 of the magnitude of the received power. More specifically, the RX 102 transmits a Signal Strength packet (hereinafter, referred to as an "SS packet") to the TX 101. The TX 101 thus receives a response from the RX 102 receiving the digital ping, and thereby recognizes that the object detected in the selection phase is the RX 102. Receiving the notification of the received voltage value, the TX 101 transitions to the I&C phase.

(3) In the I&C phase, the TX 101 identifies the RX 102 and obtains device configuration information (capability information) from the RX 102. For that purpose, the RX 102 transmits an Identification (ID) packet and a Configuration packet to the TX 101. The ID packet includes identification information about the RX 102. The Configuration packet includes the device configuration information (capability information) about the RX 102. Receiving the ID packet and the Configuration packet, the TX 101 responds with an Acknowledge (ACK). The I&C phase ends.

(4) In the negotiation phase, the value of the GP is determined based on the value of the GP requested by the RX 102 and the power transmission capability of the TX 101.

(5) In the calibration phase, the RX 102 notifies the TX 101 of the received power value using a Received Power packet based on the WPC standard. The TX 101 obtains the transmitted power corresponding to the received power, and stores the transmitted power in association with the received power. The TX 101 then calculates parameters for power loss-based foreign object detection processing based on at least two pairs of received power and transmitted power, and stores the parameters. In the present exemplary embodiment, the parameters for foreign object detection processing are also calculated and stored in the power transfer phase to be described below. Foreign object detection refers to processing for determining whether there is an object different from the RX 102 (hereinafter, referred to as a foreign object) within the coverage of power transmission of the TX 101 or whether there is likely to be such a foreign object.

In the power transfer phase, a start of power transmission, continuation of the power transmission, and a stop of the power transmission due to the detection of a foreign object or a full charge are controlled.

The TX 101 and the RX 102 superpose signals related to the communication for such power transmission and reception control upon the power using antennas (coils) that are the same as those for wireless power transfer based on the WPC standard. The TX 101 and the RX 102 can thus perform the communication for power transmission and reception control using antennas (coils) that are the same as those for wireless power transfer. The range where the TX 101 and the RX 102 can communicate based on the WPC standard is substantially the same as the coverage of power transmission. In other words, in FIG. 1, the range 104 indicates the range where wireless power transfer and communication can be performed by using the power transmission and reception coils of the TX 101 and the RX 102.

<Apparatus Configuration>

Next, a configuration of the power transmission apparatus 101 (TX 101) and the power reception apparatus 102 (RX 102) according to the present exemplary embodiment will be described. The configuration described below is just an example, and a part (or sometimes all) of the configuration to be described may be replaced with other configurations providing other similar functions or omitted. Additional configurations may be added to the configuration to be described. One block described in the following description may be divided into a plurality of blocks. A plurality of blocks may be integrated into one.

Figure 2:
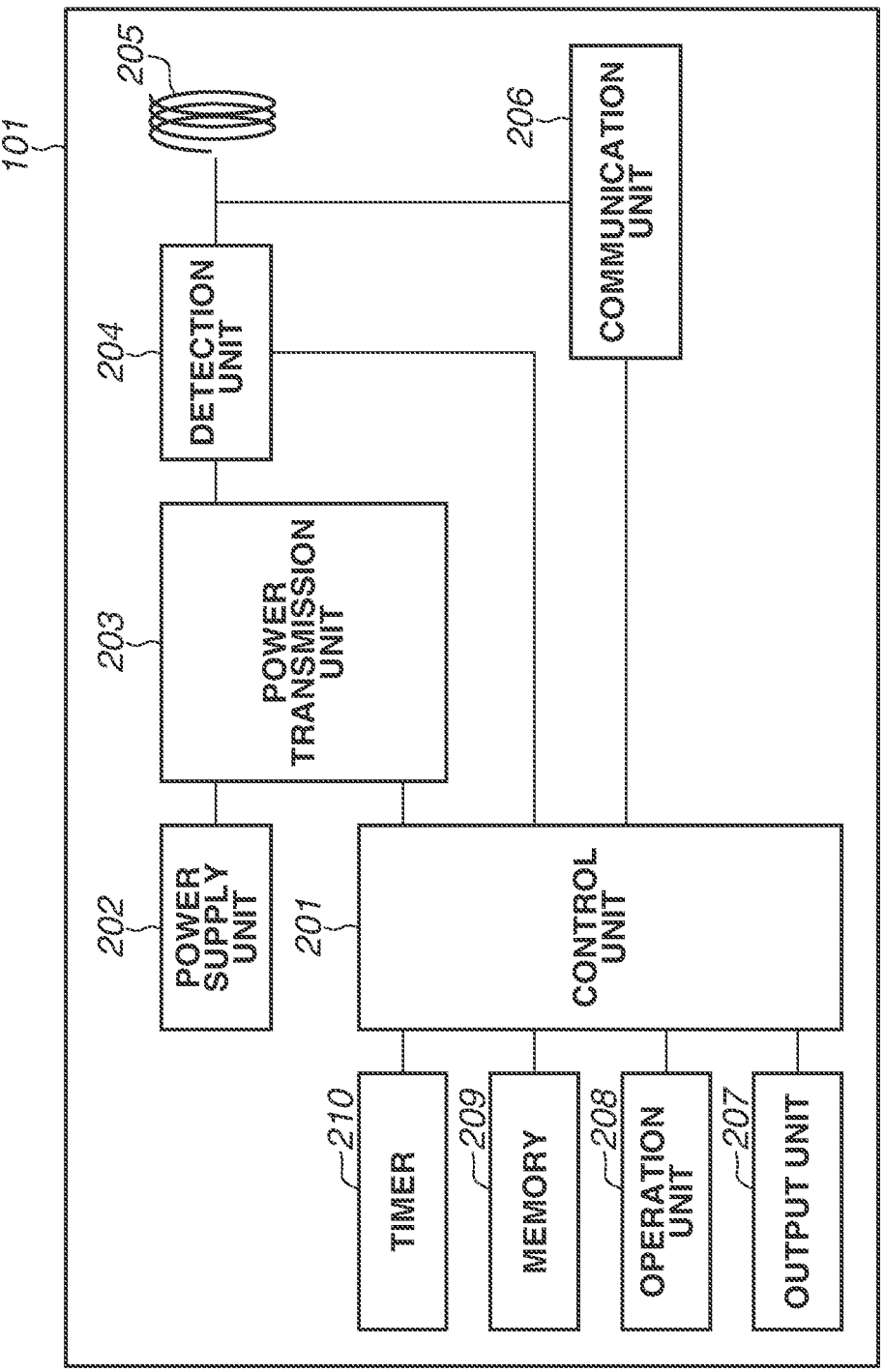
FIG. 2 is a diagram illustrating a configuration example of a power transmission apparatus.

FIG. 2 is a diagram illustrating a configuration example of the power transmission apparatus 101 (TX 101) according to the present exemplary embodiment. The TX 101 includes a control unit 201, a power supply unit 202, a power transmission unit 203, a detection unit 204, a power transmission coil 205, a communication unit 206, an output unit 207, an operation unit 208, a memory 209, and a timer 210.

The control unit 201 controls the entire TX 101 by executing a control program stored in the memory 209, for example. In other words, the control unit 201 controls the functional units illustrated in FIG. 2. The control unit 201 performs control related to power transmission control in the TX 101. For example, the control unit 201 performs device authentication and control needed for power transmission in the TX 101. The control unit 201 may control execution of applications different from the wireless power transfer application. The control unit 201 includes one or more processors such as a central processing unit (CPU) and a micro processing unit (MPU). The control unit 201 may include hardware dedicated to specific processing, like an application specific integrated circuit (ASIC). The control unit 201 may include an array circuit such as a field programmable gate array (FPGA) compiled to perform predetermined processing. The control unit 201 stores information to be stored during execution of various types of processing in the memory 209. Moreover, the control unit 201 can measure time using the timer 210. When the detection unit 204 to be described below detects a foreign object, the control unit 201 restricts power transfer by the power transmission unit 203 to be described below based on the detection of a foreign object.

The power supply unit 202 transfers power needed for control, power transmission, and communication to the entire TX 101. An example of the power supply unit 202 is a commercial power source or a battery. The battery stores power transferred from the commercial power source.

The power transmission unit 203 converts direct-current or alternating-current power input from the power supply unit 202 into alternating-current frequency power in a frequency band to be used for the wireless power transfer. The power transmission unit 203 further inputs the alternating-current frequency power to the power transmission coil 205 to generate electromagnetic waves for the RX 102 to receive. The alternating-current power generated by the power transmission unit 203 has a frequency of around several hundreds of kilohertz (for example, 110 kHz to 205 kHz).

The power transmission unit 203 inputs the alternating-current frequency power to the power transmission coil 205 based on instructions from the control unit 201 so that electromagnetic waves for transmitting power to the RX 102 are output from the power transmission coil 205. The power transmission unit 203 also controls the intensity of the electromagnetic waves to be output by adjusting the voltage (power transmission voltage) or current (power transmission current) input to the power transmission coil 205. An increase in the power transmission voltage or the power transmission current increases the intensity of the electromagnetic waves. A decrease in the power transmission voltage or the power transmission current reduces the intensity of the electromagnetic waves. The power transmission unit 203 also controls the output of the alternating-current frequency power to start or stop the power transmission from the power transmission coil 205 based on instructions from the control unit 201. The power transmission unit 203 of the RX 102 according to the present exemplary embodiment includes a switch on a circuit connected to the power transmission coil 205. In measuring a quality factor (Q factor) to be described below, the power transmission unit 203 stops the application of the voltage to the power transmission coil 205 by changing the switch in the power transmission unit 203 to disconnect the connection with the power transmission coil 205. Note that the switch may be located different from inside the power transmission unit 203. For example, the switch may be disposed between the power transmission unit 203 and the detection unit 204 in FIG. 2, or between the detection unit 204 and the power transmission coil 205.

The detection unit 204 detects whether there is an object within the range 104 by measuring the voltage or current of the power transmission coil 205. For example, the detection unit 204 detects the voltage or current of the power transmission coil 205 when an analog ping according to the WPC standard is transmitted via the power transmission coil 205. If the voltage falls below a predetermined voltage value or the current value exceeds a predetermined current value, the detection unit 204 can determine that there is an object in the range 104. As for whether this object is the RX 102 or a foreign object, the object is determined to be the RX 102 if a predetermined response to a digital ping subsequently transmitted from the communication unit 206 is received. The detection unit 204 measures the voltage of the power transmission coil 205 in obtaining the Q factor as will be described below, and detects a foreign object using the Q factor obtained based on the measurement. Details will be described below.

The communication unit 206 performs the foregoing control communication based on the WPC standard with the RX 102. The communication unit 206 modulates electromagnetic waves to be output from the power transmission coil 205 to transmit information to the RX 102. Moreover, the communication unit 206 obtains information transmitted from the RX 102 by demodulating electromagnetic waves that are output from the power transmission coil 205 and modulated by the RX 102. In other words, the communication performed by the communication unit 206 is superposed on the power transmission from the power transmission coil 205.

The output unit 207 provides information for the user by using a visual, auditory, tactile, or other techniques. For example, the output unit 207 notifies the user of information indicating the state of the TX 101 and the state of the wireless power transfer system including the TX 101 and the RX 102 in FIG. 1. The output unit 207 includes, for example, a liquid crystal display, a light emitting diode (LED), a speaker, a vibration generating circuit, and/or other notification devices.

The operation unit 208 has an acceptance function of accepting the user's operations on the TX 101. For example, the operation unit 208 includes a button, a keyboard, an audio input device such as a microphone, a motion detection device such as an acceleration sensor or a gyro sensor, and/or other input devices. A device integrating the output unit 207 and the operation unit 208, like a touchscreen, may be used.

The memory 209 stores various types of information. The memory 209 may store information obtained by functional units different from the control unit 201. The timer 210 clocks time, for example, by using a count-up timer for measuring an elapsed time from the time of activation, a count-down timer for counting down a set time, or the like.

Figure 3:
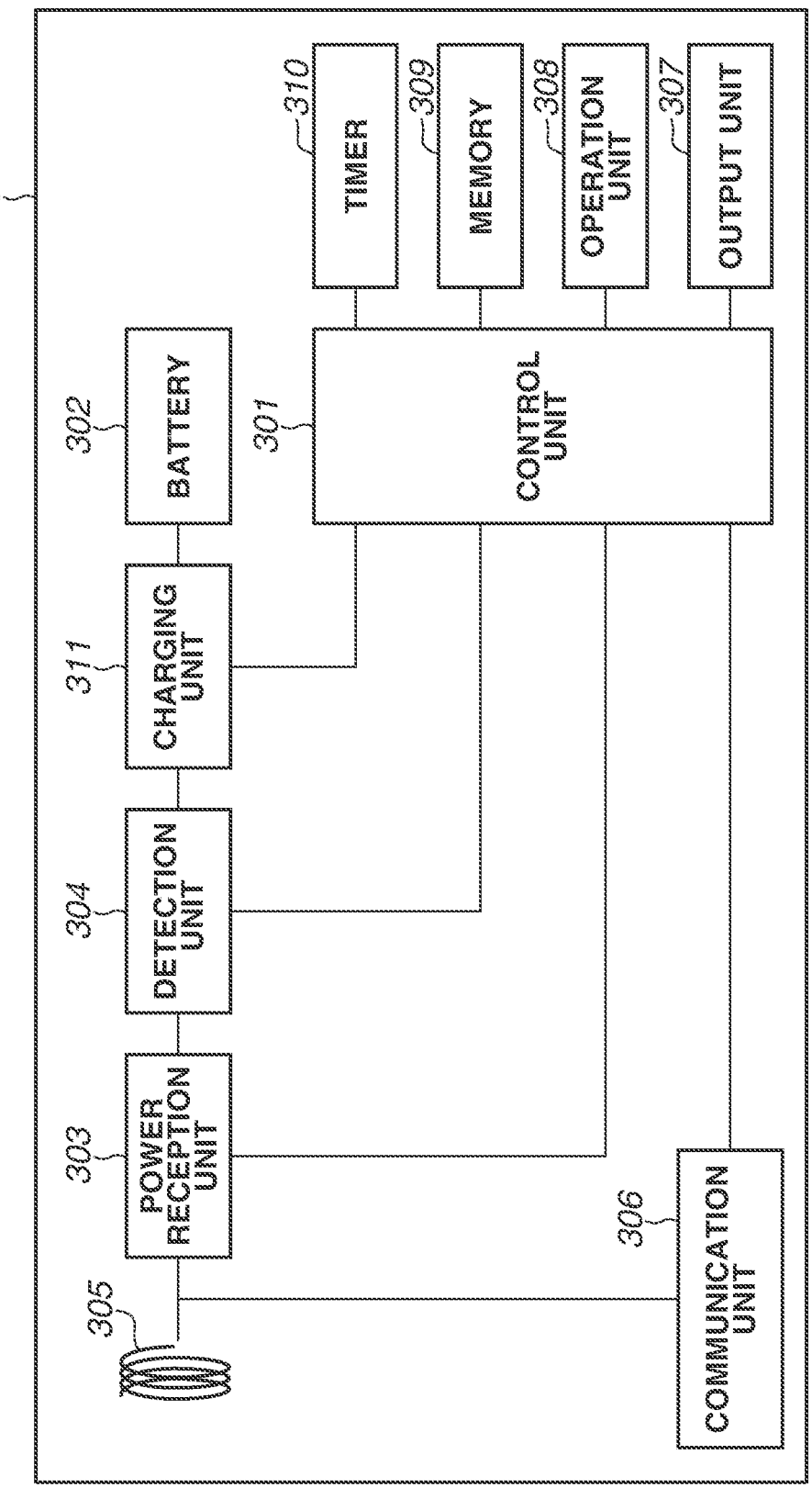
FIG. 3 is a diagram illustrating a configuration example of a power reception apparatus.

FIG. 3 is a diagram illustrating a configuration example of the power reception apparatus 102 (RX 102) according to the present exemplary embodiment. The RX 102 includes a control unit 301, a battery 302, a power reception unit 303, a detection unit 304, a power reception coil 305, a communication unit 306, an output unit 307, an operation unit 308, a memory 309, a timer 310, and a charging unit 311.

The control unit 301 controls the entire RX 102 by executing a control program stored in the memory 309, for example. The control unit 301, for example, performs device authentication and control needed for power reception in the RX 102. The control unit 301 may control execution of applications different from a wireless power transfer application. The control unit 301 includes one or more processors such as a CPU and an MPU. The control unit 301 may include hardware dedicated for specific processing like an ASIC, and/or an array circuit such as an FPGA compiled to perform predetermined processing. The control unit 301 stores information to be stored during the execution of various types of processing in the memory 309. The control unit 301 can measure time by using the timer 310.

The battery 302 transfers power needed for control, power reception, and communication to the entire RX 102. The battery 302 also stores power received via the power reception coil 305. Electromagnetic waves radiated from the power transmission coil 205 of the TX 101 generate induced electromotive force in the power reception coil 305, and the power reception unit 303 obtains the power occurring in the power reception coil 305.

The power reception unit 303 obtains the alternating-current power generated by electromagnetic induction in the power reception coil 305. The power reception unit 303 then converts the alternating-current power into direct-current power or alternating-current power having a predetermined frequency, and outputs the power to the charging unit 311 that performs processing for charging the battery 302. In other words, the power reception unit 303 transfers power to a load in the RX 102. The foregoing GP refers to the electric power guaranteed to be output from the power reception unit 303.

The detection unit 304 detects whether the RX 102 is placed within the range 104 capable of power reception from the TX 101. For example, the detection unit 304 detects the voltage or current of the power reception coil 305 when the power reception unit 303 receives a digital ping compliant with the WPC standard via the power reception coil 305. For example, if the detected voltage falls below a predetermined voltage threshold or if the detected current value exceeds a predetermined current threshold, the detection unit 304 can determine that the RX 102 is placed within the range 104.

The communication unit 306 performs the foregoing control communication based on the WPC standard with the TX 101 by communicating superposed signals using an antenna (coil) that is the same as that for wireless power transmission based on the WPC standard. The communication unit 306 obtains information transmitted from the TX 101 by demodulating the electromagnetic waves input from the power reception coil 305. The communication unit 306 communicates with the TX 101 by further applying load modulation to the electromagnetic waves to superpose information to be transmitted to the TX 101 on the electromagnetic waves. In other words, the communication by the communication unit 306 can be performed through superposition on the power transmission from the power transmission coil 205 (FIG. 2) of the TX 101.

The output unit 307 provides information for the user by using a visual, auditory, tactile, or other techniques. For example, the output unit 307 notifies the user of information indicating the state of the RX 102 and the state of the wireless power transfer system including the TX 101 and the RX 102 in FIG. 1. The output unit 307 includes, for example, a liquid crystal display, an LED, a speaker, a vibration generating circuit, and/or other notification devices.

The operation unit 308 has an acceptance function of accepting the user's operations on the RX 102. For example, the operation unit 308 includes a button, a keyboard, an audio input device such as a microphone, a motion detection device such as an acceleration sensor or a gyro sensor, and/or other input devices. A device integrating the output unit 307 and the operation unit 308, like a touchscreen, may be used.

The memory 309 stores various types of information. The memory 309 may store information obtained by functional units different from the control unit 301. The timer 310 clocks time, for example, by using a count-up timer for measuring an elapsed time from the time of activation, a count-down timer for counting down a set time, or the like.

Next, processing performed by the power transmission apparatus 101 (TX 101) and the power reception apparatus (RX 102) according to the present exemplary embodiment will be described with reference to the drawings.

<Processing by Power Transmission Apparatus>

FIG. 4 is a flowchart illustrating the processing performed by the power transmission apparatus 101 (TX 101) according to the present exemplary embodiment. The flowchart illustrated in FIG. 4 can be implemented by the control unit 201 of the TX 101 executing the control program stored in the memory 209 to calculate information, process information, and control pieces of hardware.

In step F401, the control unit 201 performs processing defined as the selection phase and the ping phase of the WPC standard. The RX 102 then detects that the RX 102 is placed on the charging table 103 of the TX 101 by detecting a digital ping from the TX 101, for example. Detecting the digital ping, the RX 102 transmits an SS packet including the value of the received voltage to the TX 101. The RX 102 is thus detected to be placed within the coverage of power transmission of the TX 101.

In step F402, the control unit 201 obtains identification information and capability information from the RX 102 by performing communication in the I&C phase via the communication unit 206. The identification information about the RX 102 can include a Manufacturer Code and a Basic Device ID. The capability information about the RX 102 can include information capable of identifying the supported version of the WPC standard, a Maximum Power Value indicating the maximum value of power receivable by the RX 102, and information indicating whether the RX 102 has the negotiation function of the WPC standard. The TX 101 may obtain the identification information and the capability information about the RX 102 by using a method different from the communication in the I&C phase. The identification information may include information capable of identifying the individual RX 102, such a Wireless Power ID. The identification information can thus include information different from the foregoing. The capability information may also include information different from the foregoing.

In step F403, the control unit 201 communicates in the negotiation phase via the communication unit 206, and thereby determines the value of the GP based on the value of the GP requested by the RX 102, etc.

In step F404, the control unit 201 starts processing in the calibration phase (hereinafter, referred to as calibration processing). As employed herein, the calibration processing refers to processing for calibrating a correlation between the value (transmitted power) measured inside the TX 101 and the value (received power) measured inside the RX 102 as to the power transmitted from the TX 101 to the RX 102. In the calibration phase, the TX 101 performs power transmission for communicating information in the calibration processing and obtaining the foregoing power correlation.

Figure 7A:
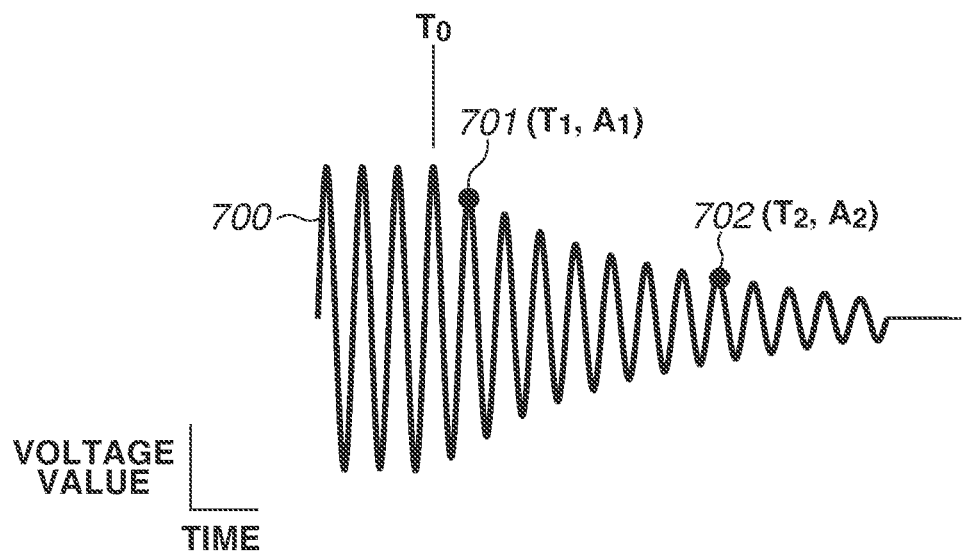
FIG. 7A is a diagram for describing a method for measuring a quality (Q) factor.

Steps F404 to F407 represent the processing performed in the calibration phase. Here, the Q factor for checking that there is no foreign object within the coverage of power transmission is measured. A method for measuring the Q factor in a time domain will be described with reference to FIG. 7A. FIG. 7A illustrates a waveform indicating a temporal change in the measurement value of the voltage (hereinafter, referred to as voltage value) in the power transmission coil 205 of the TX 101. The horizontal axis indicates the time, and the vertical axis the voltage value. A waveform 700 indicates the voltage value of a high-frequency voltage applied to the power transmission coil 205. Time $T_0$ represents the time when the application of the high-frequency voltage to the power transmission coil 205 is stopped. A point 701 is part of an envelope to the voltage value indicated by the waveform 700. $(T_1, A_1)$ corresponding to the point 701 indicates that the voltage value at time $T_1$ is $A_1$. Similarly, a point 702 is part of the envelope to the voltage value indicated by the waveform 700. $(T_2, A_2)$ corresponding to a point 702 indicates that the voltage value at time $T_2$ is $A_2$.

The Q factor is measured based on a change in the voltage value after the application of the high-frequency voltage to the power transmission coil 205 is stopped. In the example illustrated in FIG. 7A, the Q factor is obtained by measuring the amount of change in the voltage value from time $T_0$ on. In the case of FIG. 7A, for example, the voltage values $A_1$ and $A_2$ are respectively measured at times $T_1$ and $T_2$ that are times in the period after time $T_0$ when the application of the high-frequency voltage is stopped. Based on the times and measured voltages, the Q factor is calculated by Eq. 1:

$$Q=\omega(T_2-T_1)/2 \ln(A_1/A_2) \qquad \text{(Eq. 1)}$$

The Q factor is thus calculated based on the duration from time $T_1$ to time $T_2$ and the ratio of the voltage value $A_1$ corresponding to time $T_1$ to the voltage value $A_2$ corresponding to time $T_2$. Here, $\omega$ is the angular velocity (frequency multiplied by $2\pi$) of the waveform 700 of the high-frequency voltage.

Figure 7B:
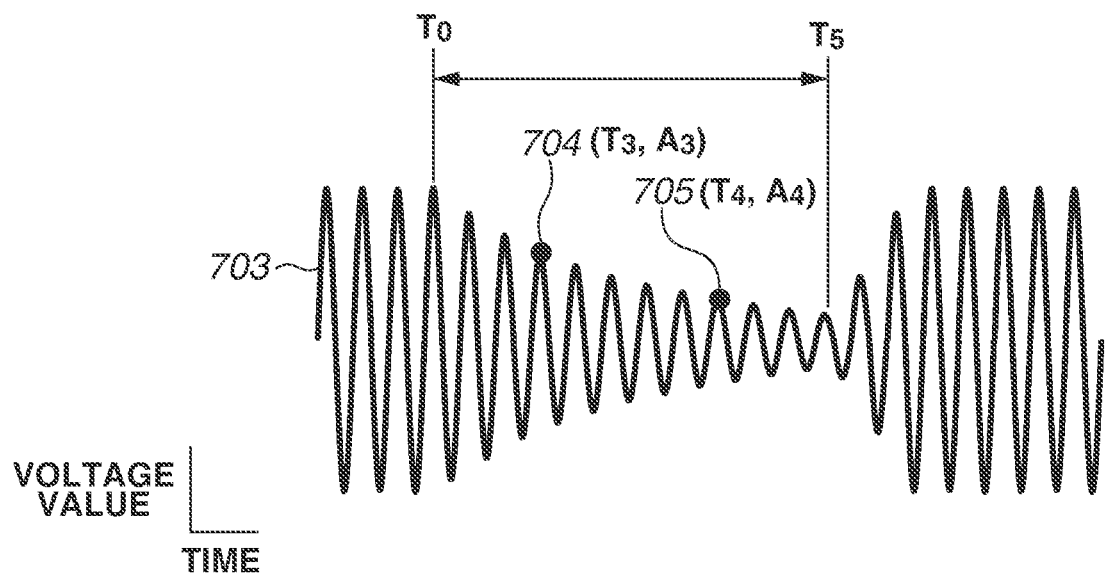
FIG. 7B is a diagram for describing a method for measuring a quality (Q) factor.

Next, the processing for the TX 101 according to the present exemplary embodiment to measure the Q factor will be described with reference to FIG. 7B. A waveform 703 represents a high-frequency voltage applied to the power transmission coil 205 by the power transmission unit 203. The waveform 703 has a frequency between 110 kHz and 148.5 kHz used in the WPC standard. In a period from time $T_0$ to time $T_5$, the power transmission unit 203 changes the switch to disconnect the connection with the power transmission coil 205, whereby the application of the high-frequency voltage is stopped. The period from time $T_0$ to time $T_5$ is extremely short compared to the period when the TX 101 transmits power to the RX 102.

A point 704 and a point 705 are part of an envelope to the voltage value indicated by the waveform 703. The power transmission unit 203 stops power transmission during the period from time $T_0$ to time $T_5$, and the detection unit 204 measures the voltage values at time $T_3$ and at time $T_4$ after a lapse of a predetermined time from time $T_3$ in this period. In the example illustrated in FIG. 7B, the voltage value at time $T_3$ and the voltage value at time $T_4$ are $A_3$ and $A_4$, respectively. The TX 101 calculates the Q factor by Eq. 1, using time $T_3$, time $T_4$, the voltage value $A_3$, the voltage value $A_4$, and the angular velocity of the high-frequency voltage. In such a manner, the detection unit 204 of the TX 101 measures the voltage values and calculates the Q factor with the power transmission unit 203 stopping power transmission to the RX 102. The TX 101 changes the switch in the transmission unit 203 to resume power transmission at time $T_5$.

By the method described above, the TX 101 according to the present exemplary embodiment obtains the Q factor. The TX 101 also performs foreign object detection based on the obtained Q factor, and checks that there is no foreign object within the coverage of power transmission. The TX 101 stores in advance the Q factor measured with no foreign object within the coverage of power transmission as a reference value. If power is transmitted in the presence of a foreign object such as a conductor piece within the coverage of power transmission, the power is consumed not only by the RX 102 but by the foreign object as well. If there is a foreign object, the voltage value when the TX 101 stops power transmission is thus expected to attenuate more than without a foreign object. The Q factor based on Eq. 1 in the presence of a foreign object is therefore expected to be smaller in value than the Q factor without a foreign object. The TX 101 thus determines that there is a foreign object (detects a foreign object) based on the fact that the obtained Q factor is less than the reference value. Here, the TX 101 calculates a difference between the obtained Q factor and the reference value, and if the difference is greater than a predetermined threshold, determines that there is a foreign object. If the difference between the obtained Q factor and the reference value is less than the predetermined threshold, the TX 101 can check that there is no foreign object within the coverage of power transmission.

Here, the communication unit 206 of the TX 101 according to the present exemplary embodiment communicates information with the RX 102 by modulating or demodulating the electromagnetic waves generated by the voltage that the power transmission unit 203 applies to the power transmission coil 205. The communication unit 306 of the RX 102 communicates information with the TX 101 by applying load modulation to the electromagnetic waves received by the power reception coil 305. Voltage values suitable to obtain the Q factor for use in foreign object detection can therefore fail to be measured if the voltage values are measured while the communication units 206 and 306 are communicating. For example, in FIG. 7B, if load modulation is performed in the period of $T_0$ to $T_5$ where the TX 101 stops voltage application, the voltage values can be different as compared to without the load modulation. The voltage values $A_3$ and $A_4$ at times $T_3$ and $T_4$ with load modulation can thus be greater or less than the voltage values without load modulation. If the Q factor obtained based on such voltage values is used for foreign object detection, a foreign object that is present can fail to be detected or a foreign object that is not there can be erroneously detected.

For such reasons, the information communication by the TX 101 and the RX 102 is desirably suspended while the power transmission apparatus measures the Q factor. In the calibration processing, the RX 102 transmits received power information for notifying of the received power and information for requesting an increase or decrease in the received power to the TX 101. The RX 102 according to the present exemplary embodiment does not communicate in specific periods defined by the WPC standard where the power reception apparatus must not transmit a signal. An example of the period where the RX 102 does not communicate is a period defined by the WPC standard where the preamble of the next packet must not be transmitted after the end of a packet transmitted by the power reception apparatus. In other words, the period where the RX 102 does not communicate refers to a period where a predetermined time defined not to transmit the next signal elapses after the transmission of a signal by the power reception apparatus. Another example of the period where the RX 102 does not communicate is a period defined by the WPC standard where the preamble of the next packet must not be transmitted after the end of a packet transmitted by the power transmission apparatus. In other words, the period where the RX 102 does not communicate refers to a period where a predetermined time defined for the power reception apparatus not to transmit the next signal elapses after the power reception apparatus receives a signal from the power transmission apparatus. The TX 101 according to the present exemplary embodiment therefore measures the Q factor by using the period where the RX 102 does not communicate. Here, the TX 101 does not transmit a signal to the RX 102, either. In step F405, the TX 101 according to the present exemplary embodiment waits until information is transmitted from the RX 102. In step F406, after the reception of the information transmitted from the RX 102, the TX 101 measures the voltage value of the power transmission coil 205 in the period where the RX 102 does not transmit information. In the following description, to measure the voltage value of the power transmission coil 205 for the sake of calculating the Q factor for use in foreign object detection will be expressed simply as to measure the Q factor. The processing for calculating the Q factor based on Eq. 1 may be performed in a period where communication is performed. The TX 101 according to the present exemplary embodiment at least measures the voltage value in the period when no communication is performed.

The foreign object detection based on the measurement of the Q factor can be used together with foreign object detection based on power loss. However, the foreign object detection based on power loss can only be performed after the end of the processing in the calibration phase for calculating the parameters for use in the foreign object detection. In other words, foreign object detection based on power loss is unable to be used in the calibration phase. If there is a foreign object within the coverage of power transmission in the calibration phase, unsuitable parameters can be obtained and the precision of the foreign object detection based on power loss in the subsequent power transfer can drop. By contrast, the foreign object detection based on the measurement of the Q factor can be performed even in the calibration phase, and whether there is a foreign object can thus be determined in the calibration phase. This enables the TX 101 to determine that there is a foreign object in the calibration phase, and restrict power transmission.

In step F407, the TX 101 performs foreign object detection by comparing the Q factor measured in step F406 with the reference value stored in advance. If a foreign object is detected (YES in step F407), then in step F414, the TX 101 stops power transmission. If no foreign object is detected (NO in step F407), then in step F408, the TX 101 ends the calibration processing.

In step F409, the TX 101 enters the power transfer phase and starts to transmit power for wireless charging to the RX 102. Even after the start of the power transmission for charging, the TX 101 regularly receives received power information from the RX 102. In step F410, the TX 101 thus monitors whether predetermined information is transmitted from the RX 102. The predetermined information refers to the foregoing received power information for notifying of power and information for requesting an increase or decrease in the received power.

In step F410, if the predetermined information is received (YES in step F410), then in step F411, the TX 101 measures the Q factor by using a period where the RX 102 does not transmit information. In step F411, foreign object detection based on the measurement of the Q factor and foreign object detection based on a loss in the transmitted power are performed. The foreign object detection based on the power loss is processing for determining that there is a foreign object if the value of the power transmitted from the TX 101 is lost by more than a predetermined amount. The foreign object detection based on the power loss is performed by the RX 102 notifying the TX 101 of the received power. Performing foreign object detection in step F411 can detect that a foreign object is placed within the coverage of power transmission during charging. The foreign object detection performed here may be either one of the foreign object detection based on the measurement of the Q factor and the foreign object detection based on the loss in the transmitted power. In step F411, at least the processing for measuring the voltage value of the power transmission coil 205 has only to be performed in the period where no communication is performed. In other words, the calculation of the Q factor based on the measured voltage value of the power transmission coil 205 and the processing for detecting a foreign object based on the Q factor can be performed during communication, and therefore can be performed after step F411, for example. The foreign object detection based on the power loss can also be performed during communication, and therefore can be performed in a step different from step F411 after the RX 102 notifies the TX 101 of the received power.

Here, the combined use of the foreign object detection based on the measurement of the Q factor and the foreign object detection based on the power loss will be described. If the result of the foreign object detection based on the measurement of the Q factor and the result of the foreign object detection based on the power loss are both "there is no foreign object", the TX 101 determines that there is no foreign object. On the other hand, if at least either one of the results of the foreign object detection based on the measurement of the Q factor and based on the power loss is "there is a foreign object", the TX 101 determines that there is (highly likely to be) a foreign object. This can prevent the TX 101 from erroneously determining that there is no foreign object and transferring power in the presence of a foreign object.

If the result of the foreign object detection based on the measurement of the Q factor and the result of the foreign object detection based on the power loss are different, the TX 101 may give a higher priority to either one of the results of the foreign object detection. Suppose, for example, that the result of the foreign object detection based on the power loss is given a higher priority, and the foreign object detection based on the measurement of the Q factor results in the determination "there is no foreign object" and the foreign object detection based on the power loss results in the determination "there is a foreign object". In such a case, the TX 101 gives a higher priority to the result of the foreign object detection based on the power loss and determines that "there is a foreign object". Similarly, the result of the foreign object detection based on the measurement of the Q factor may be given a higher priority. In the case of the foregoing method where the TX 101 determines that "there is a foreign object" if at least one of a plurality of types of foreign object detection results in the determination that "there is a foreign object", power transfer in the presence of a foreign object is avoided. However, such a method can frequently restrict power transfer. If a plurality of foreign object detection methods is used, the frequent restriction of the power transfer is expected to be prevented by determining in advance which of the results of the foreign object detection to give priority to.

In step F412, if a foreign object is detected (YES in step F412), the TX 101 stops the charging processing (F414). The processing of steps F410 to F412 is repeated until a charging completion notification transmitted from the RX 102 is received. If the predetermined information is not received in step F410 (NO in step F410) and the notification indicating the completion of the charging transmitted from the RX 102 is received (YES in step F413), then in step F414, the TX 101 stops the power transmission for charging.

<Processing by Power Reception Apparatus>

FIG. 5 is a flowchart illustrating processing performed by the power reception apparatus 102 (RX 102) according to the present exemplary embodiment. The flowchart illustrated in FIG. 5 can be implemented by the control unit 301 of the RX 102 executing the control program stored in the memory 309 to calculate information, process information, and control pieces of hardware.

In step F501, the RX 102 is placed within the coverage of power transmission of the TX 101 by the user, or the like. In step F502, the communication unit 306 transmits the identification information and the capability information to the TX 101 by communication in the I&C phase. In step F503, the control unit 301 determines the value of the GP with the TX 101 by communication in the negotiation phase via the communication unit 306. In step F503, procedures for determining the GP different from by the communication in the negotiation phase may be performed.

In step F504, the communication unit 306 performs the calibration processing for calibrating the correlation between the transmitted power and the received power with the TX 101. When the calibration processing is completed, then in step F505, power reception processing for charging the RX 102 is started. In the process of the calibration processing and the power reception processing, the RX 102 transmits the received power information for notifying of the received power, the information for requesting an increase or decrease in the received power, and the like to the TX 101. When the charging is completed, then in step F506, the RX 102 transmits a notification indicating the completion of the charging to the TX 101.

<Operation Sequence of Power Transmission Apparatus and Power Reception Apparatus>

FIG. 6 illustrates an operation sequence of the power transmission apparatus 101 (TX 101) and the power reception apparatus 102 (RX 102). In step S601, the TX 101 intermittently transmits an analog ping compliant with the WPC standard to detect an object present within the coverage of power transmission of the TX 101. In step S602, the RX 102 is placed within the coverage of power transmission of the TX 101 by the user, or the like. The TX 101 detects that the voltage of the power transmission coil 205 becomes lower than a predetermined value or the current of the power transmission coil 205 becomes higher than a predetermined value in transmitting an analog ping. In steps S603 and S604, the TX 101 thereby detects that there is an object within the coverage of power transmission. In step S605, after the detection of the object present within the coverage of power transmission, the TX 101 transmits a digital ping compliant with the WPC standard. In step S606, the RX 102 receives the digital ping and recognizes its detection by the TX 101. If a predetermined response to the digital ping is made, the TX 101 detects that the detected object is the RX 102 and that the RX 102 is placed on the charging table 103.

Having detected that the RX 102 is placed, then in step S607, the TX 101 obtains the identification information and the capability information from the RX 102 by performing communication in the I&C phase of the WPC standard. In step S608, the TX 101 determines the value of the GP with the RX 102 by communication in the negotiation phase of the WPC standard. In step S608, procedures for determining the GP different from the communication in the negotiation phase of the WPC standard may be performed. If the RX 102 does not support the negotiation phase of the WPC standard, the RX 102 transmits information indicating that the negotiation phase is not supported to the TX 101 at the timing of step S607, or the like. If the TX 101 obtains the information indicating that the RX 102 does not support the negotiation phase of the WPC standard, the TX 101 may here determine the GP without performing the communication in the negotiation phase. In such a case, the GP is determined to have a value defined by the WPC standard, for example. In the example of FIG. 6, GP is determined to be 5 watts (W) in step S608.

Next, the calibration processing is performed. In step S609, the RX 102 initially transmits first reference power information to the TX 101. As employed herein, reference power information is information indicating the power received by the RX 102. In step S610, after the transmission of the reference power information, the RX 102 stops communication (information transmission) until a predetermined time elapses, based on the WPC standard. In step S611, the TX 101 receives the reference power information transmitted from the RX 102 and measures the Q factor by using the period where the RX 102 does not communicate. The TX 101 checks whether there is a foreign object within the coverage of power transmission based on the measurement of the Q factor. If a foreign object is detected, the TX 101 ends the power transmission processing for the RX 102.

In step S609, the RX 102 transmits information indicating that a power of 500 mW (milliwatts) is received as the first reference power information. The first reference power information is information indicating the power received by the power reception coil 305, measured in a state where the power reception unit 303 and the charging unit 311 are not connected. The TX 101 determines whether to accept the first reference power information based on the power transmission state of the own apparatus. If the first reference power information is accepted, the TX 101 transmits an acknowledgement (ACK) to the RX 102. If the first reference power information is rejected, the TX 101 transmits a negative acknowledgment (NAK) to the RX 102. Here, the TX 101 can determine to accept the first reference power information if the power indicated by the first reference power information is determined as being stably transmitted, and determine to reject the first reference power information if the power indicated by the first reference power information is determined as not being stably transmitted. In the example of FIG. 6, the TX 101 determines that the transmission state is stable, and in step S612, transmits the ACK to the RX 102. If the TX 101 transmits the NAK, the RX 102 measures the received voltage value again and transmits new first reference power information to the TX 101.

Now, the execution timing of step S611 (measurement of the Q factor) and step S612 (transmission of the ACK) will be described. If the processing of step S611 and that of step S612 overlap, voltage values suitable to obtain the Q factor for use in foreign object detection can fail to be measured due to the foregoing reason. Moreover, if the TX 101 stops the voltage application during the transmission of the ACK, the ACK data can be broken. The processing of step S611 and that of step S612 are therefore desirably performed not to overlap. The period where the RX 102 does not communicate is a period for waiting for a response from the TX 101. The RX 102 thus resumes communication when the ACK or NAK transmitted from the TX 101 is obtained. The TX 101 therefore measures the Q factor before transmitting the ACK. Note that the processing for determining whether there is a foreign object based on the measurement of the Q factor may be performed before the transmission of the ACK or after the transmission of the ACK.

After the reception of the ACK from the TX 101, the RX 102 performs processing for requesting the TX 101 to transmit power corresponding to the value of the GP. In the example of FIG. 6, GP=5 W. In step S613, the RX 102 thus transmits instruction information indicating an instruction to change the power transmission output so that the power transmitted by the TX 101 increases to 5 W. This instruction information can include a value (positive value) indicating the amount of increase in the power. Even after the transmission of the instruction information, the RX 102 does not communicate until a predetermined time elapses, based on the WPC standard. In step S615, the TX 101 measures the Q factor by using the period where the RX 102 does not communicate, and performs foreign object detection based on the Q factor. After the measurement of the Q factor, in steps S616 and S617, the TX 101 transmits an ACK to the RX 102 as a response indicating that the power increase instruction indicated by the instruction information can be accommodated, and changes the power transmission output based on the instruction information.

In step S618, the RX 102 transmits information indicating that a power of 5 W is received as second reference power information. The second reference power information is information indicating the power received by the power reception coil 305, measured in a state where the power reception unit 303 and the charging unit 311 are connected. In steps S619 and S620, the TX 101 measures the Q factor and performs foreign object detection by using the period where the RX 102 does not communicate after the transmission of the second reference power information. The TX 101 also calculates an estimated value of the loss in the transmitted power based on at least either the voltage value or the current value of the power transmission coil 205 when the own apparatus transmits the power, and the first and second reference power information. In step S621, the TX 101 performs foreign object detection based on the calculated estimated value of the power loss. In step S622, the TX 101 transmits an ACK to the RX 102 as a response indicating the acceptance of the second reference power information transmitted from the RX 102. The processing of steps S621 and S622 may be performed in reverse order. By the processing up to step S622, the TX 101 completes the calibration processing, determines that the charging processing can be started, and starts power transmission processing for the RX 102, whereby the charging of the RX 102 is started.

Now, an operation sequence in a case where the once determined GP is changed (re-determined) will be described with reference to step S623 and the subsequent steps in FIG. 6. For example, in step S623, the TX 101 and the RX 102 perform authentication processing for authenticating each other's devices, and determine whether each other's devices support GP higher than the current GP (5 W) based on the authentication result. If higher GP is determined to be supported, then in step S624, the TX 101 and the RX 102 re-determine the GP to be 15 W, for example. Whether higher GP is supported may be determined by using methods different from the authentication processing. The RX 102 transmits instruction information for increasing the power transmission output of the TX 101 so that the power transmission output increases to 15 W. The TX 101 transmits an ACK or NAK to the RX 102 as a response to the instruction information. If the ACK is transmitted, the TX 101 increases the power transmission output based on the instruction information. Again, in this step, the TX 101 measures the Q factor and performs foreign object detection by using the period where the RX 102 does not communicate after the transmission of the information. Like step S621, foreign object detection based on the estimated value of the power loss is also performed (steps S625 to S630).

The TX 101 and the RX 102 perform the calibration processing again. In step S631, the RX 102 transmits information indicating that the re-determined GP=15 W is received to the TX 101 as third reference power information. In step S633, the TX 101 measures the Q factor and performs foreign object detection by using the period where the RX 102 does not communicate after the transmission of the third reference power information. In step S634, the TX 101 also performs foreign object detection by calculating the estimated value of the power loss based on at least either the voltage value or the current value of the power transmission coil 205 when the own apparatus transmits the power, and the first, second, and third reference power information. In step S635, the TX 101 transmits an ACK in response to the third reference power information transmitted from the RX 102, and starts power transmission processing. As for step S631, if the TX 101 is unable to respond to the third reference power information within a predetermined time, the TX 101 may transmit a power of 15 W while deferring the transmission of the ACK, or continue transmitting power up to a transmission power of 5 W. Here, the TX 101 and the RX 102 may display a screen for causing the user to select whether to perform charging with 15 W or with 5 W on the respective output units 207 and 307. The user may operate the operation unit 208 or 308 to specify which to select. The user may operate the operation screen displayed on the output unit 207 or 307 for specification.

As described above, the TX 101 measures the voltage value of the power transmission coil 205 when the voltage application to the power transmission coil 205 is stopped, and calculates the Q factor in a period where the RX 102 does not communicate after transmission of information. The TX 101 also performs foreign object detection based on the calculated Q factor, and if a foreign object is detected, stops power transmission. This can prevent power transmission from being continued if there is a conductive foreign object within the range of power transmission. Moreover, the TX 101 can detect a foreign object with higher reliability by performing the foregoing method and the foreign object detection based on the power loss in combination. The processing by the TX 101 when a foreign object is detected may include imposing restrictions to stop the power transmission as described above, or restricting the transmitted power to be lower than at a point in time when no foreign object is detected.

The processing when a foreign object is detected may include determining the GP between the TX 101 and the RX 102 again. If the RX 102 is determined to be capable of re-negotiation for the GP, the TX 101 transmits a signal for instructing the RX 102 to perform re-negotiation for determining the GP again. Here, the TX 101 may notify the power reception apparatus of the maximum negotiable GP value. The maximum negotiable GP value may be limited to 5 W. If the RX 102 is determined to be incapable of re-negotiation for the GP, the TX 101 performs processing such as restricting the transmitted power to be lower than at a point in time when no object is detected, changing the value of the transmitted power to a predetermined value (for example, 5 W), or stopping the power transmission.

Second Exemplary Embodiment

The following description deals mainly with differences from the first exemplary embodiment. A power transmission apparatus 101 (TX 101) and a power reception apparatus 102 (RX 102) have a configuration similar to that in the first exemplary embodiment. A description thereof will thus be omitted.

<Processing by Power Transmission Apparatus>

FIG. 8 is a flowchart illustrating processing performed by the power transmission apparatus 101 (TX 101) according to the second exemplary embodiment. The flowchart illustrated in FIG. 8 can be implemented by the control unit 201 of the TX 101 executing a control program stored in the memory 209 to calculate information, process information, and control pieces of hardware. The processing of steps F801 to F804 is similar to that of steps F401 to F404 in FIG. 4. A description thereof will thus be omitted.

With the calibration processing started in step F804, then in step F805, the RX 102 transmits received power information for notifying of the received power and information for requesting an increase or decrease in the received power to the TX 101. In step F806, the TX 101 responds to the received information with an ACK or the like. Here, the TX 101 transmits the ACK data with additional information for enabling identification of timing to measure the Q factor. For example, the TX 101 adds time information indicating the time to measure the Q factor by using a data format illustrated in FIG. 11. Examples of the time information may include a value based on an elapsed time with reference to the time when the TX 101 is activated, and a value indicating an offset time from the time when the ACK is transmitted. If the value based on the elapsed time is applied, the TX 101 and the RX 102 are set to perform processing based on the same time. For example, the TX 101 and the RX 102 are set to synchronize their processing time by sharing the time at which the TX 101 is activated, the time elapsed since the activation of the TX 101, and the like in the I&C phase, etc. The RX 102 obtains the ACK from the TX 101 and stops performing communication at the time indicated by the time information. If the value indicating the offset time is applied, the RX 102 obtains the ACK from the TX 101 and stops communication until the offset time indicated by the time information elapses.

The TX 101 transmits the ACK with such additional time information, and measures the Q factor in the period where the RX 102 does not communicate based on the time information. The processing of steps F808 to F810 is similar to that of steps F407 to F409. A description thereof will thus be omitted. In step F811, the TX 101 monitors whether predetermined information (such as received power information for notifying of power and information for requesting an increase or decrease in the received power) is transmitted from the RX 102. In step F811, if the predetermined information is received (YES in step F811), then in step F812, the TX 101 transmits an ACK as a response to the predetermined information. Here, the TX 101 transmits the ACK with the foregoing additional time information, for example. In step F813, the TX 101 measures the Q factor and performs foreign object detection based on the timing indicated by the transmitted time information. Here, the TX 101 may perform foreign object detection based on power loss. The foreign object detection based on power loss may be configured to be performed in a step different from step F813, or configured not to be performed throughout the processing. The method for measuring the Q factor and the methods for detecting a foreign object are similar to those of the first exemplary embodiment. The processing of steps F814 to F816 are similar to the processing of steps F412 to F414. A description thereof will thus be omitted.

As described above, the TX 101 transmits, to the RX 102, information for enabling the identification of the timing to measure the Q factor, and can thereby prevent communication from being performed during the measurement of the Q factor. The information added to the ACK is not limited to the foregoing and may be any information from which the timing for the TX 101 to measure the Q factor can be identified. For example, the TX 101 may transmit instruction information for instructing the RX 102 to stop communication, and the RX 102 may stop performing communication until a predetermined time elapses from the acquisition of the instruction information. The predetermined time here may be set in advance based on the time needed to measure the Q factor, a delay time related to communication between the RX 102 and the TX 101, and the like, or may be included in the instruction information. The predetermined time may be determined by communication in the negotiation phase in step F803. The TX 101 may transmit the time information, the instruction information, and the like individually instead of adding the information to the ACK. Like the first exemplary embodiment, the method for measuring the Q factor in a period where communication is not performed after the transmission of predetermined information from the RX 102 may also be combined. For example, the TX 101 may be configured to use the method described in the present exemplary embodiment in steps F805 to F807, and use the method described in the first exemplary embodiment in step F810 and the subsequent steps. Such modifications can be applied to the following description as well.

<Processing by Power Reception Apparatus>

Figure 9:
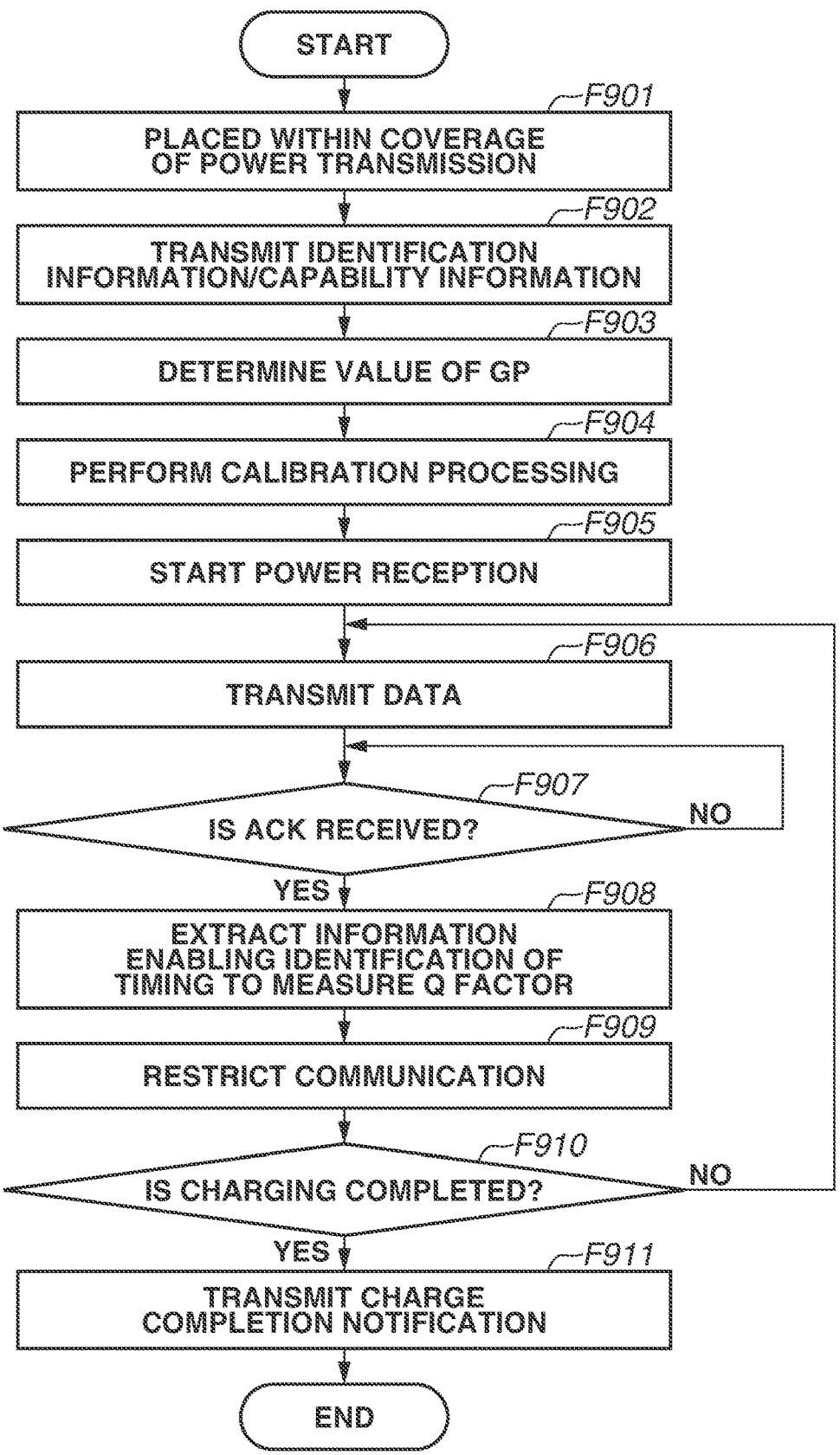
FIG. 9 is a flowchart for describing processing performed by a power reception apparatus according to the second exemplary embodiment.

FIG. 9 is a flowchart illustrating processing performed by the power reception apparatus 102 (RX 102) according to the second exemplary embodiment. The flowchart illustrated in FIG. 9 can be implemented by the control unit 301 of the RX 102 executing a control program stored in the memory 309 to calculate information, process information, and control pieces of hardware. The processing of steps F901 to F905 is similar to that of steps F501 to F505 in FIG. 5. A description thereof will thus be omitted. In step F906, with the power reception processing started, the RX 102 transmits the received power information for notifying of the received power and data for requesting an increase or decrease in the received power. In step F907, the RX 102 receives an ACK or the like from the TX 101 as a response to the transmitted information. In step F908, since the time information for enabling the identification of the timing for the TX 101 to measure the Q factor is added to the ACK here, the RX 102 extracts the time information. In step F909, the RX 102 restricts communication based on the time information. The RX 102 then repeats the processing of steps F906 to F909 until the charging is completed. In step F910, if the charging is completed (YES in step F910), then in step F911, the RX 102 transmits a notification indicating the completion of the charging to the TX 101.

<Operation Sequence of Power Transmission Apparatus and Power Reception Apparatus>

Figure 10:
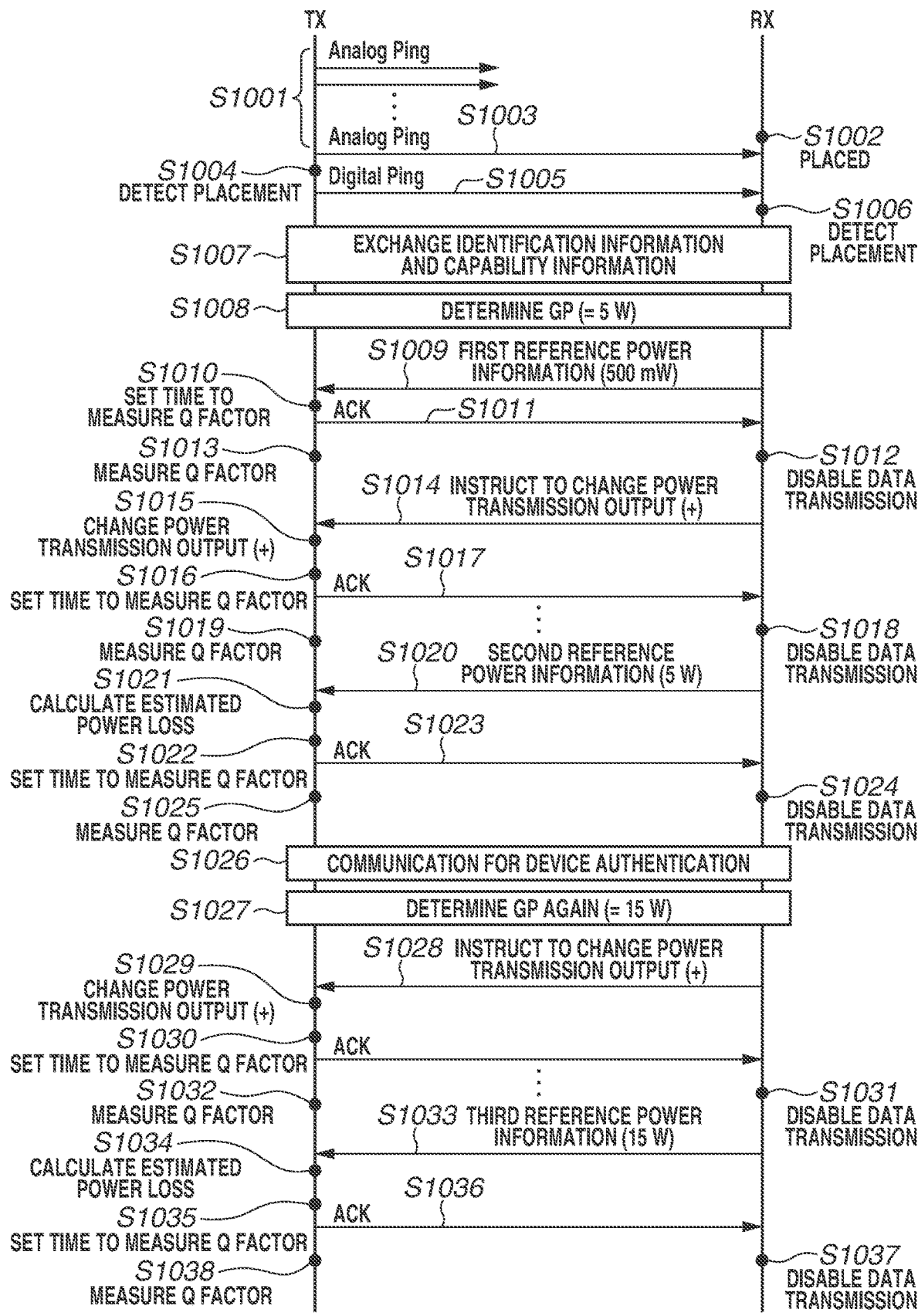
FIG. 10 is a sequence diagram for describing an operation of the power transmission apparatus and the power reception apparatus according to the second exemplary embodiment.

FIG. 10 illustrates an operation sequence of the power transmission apparatus 101 (TX 101) and the power reception apparatus 102 (RX 102) according to the second exemplary embodiment. The processing of steps S1001 to S1008 is similar to that of steps S601 to S608 in FIG. 6. A description thereof will thus be omitted.

Having determined the value of the GP with the RX 102, the TX 101 starts the calibration processing. In step S1009, the RX 102 initially transmits to the TX 101 information indicating the power received by the power reception coil 305 in a state where the power reception unit 303 is connected to the charging unit 311, as first reference power information. In the example of FIG. 10, the first reference power information is 500 mW. The TX 101 determines whether to accept the first reference power information based on the power transmission state of the own apparatus. If the TX 101 determines to accept the first reference power information, the TX 101 transmits an ACK to the RX 102. If the TX 101 determines to reject the first reference power information, the TX 101 transmits a NAK to the RX 102. In the example of FIG. 10, the TX 101 determines that the power indicated by the first reference power information is being stably transmitted, and transmits the ACK to the RX 102.

In steps S1010 and S1011, the TX 101 sets the timing to measure the Q factor, adds time information to the ACK as information capable of identifying the timing, and transmits the ACK. In step S1012, the RX 102 receiving the ACK extracts the time information added to the ACK, and restricts communication based on the time information. In step S1013, the TX 101 measures the Q factor based on the timing indicated by the time information, and performs foreign object detection.

After the restriction of communication for a predetermined period based on the time information, the RX 102 transmits to the TX 101 information indicating the power received by the power reception coil 305 in the state where the power reception unit 303 is connected to the charging unit 311, as second reference power information. In the example of FIG. 10, GP=5 W, and the second reference power information is thus 5 W. In step S1014, the RX 102 transmits instruction information for instructing a change in the power transmission output so that the power transmitted by the TX 101 increases to 5 W. In step S1015, the TX 101 receives the instruction information transmitted from the RX 102, and if the increase in the transmitted power can be accommodated, increases the transmitted power.

In steps 1016 and S1017, the TX 101, when responding to the instruction information, also transmits an ACK with additional time information for enabling the identification of the timing to measure the Q factor. In step S1018, the RX 102 receiving the ACK extracts the time information added to the ACK, and restricts communication based on the time information. In step S1019, the TX 101 measures the Q factor based on the timing indicated by the time information, and performs foreign object detection.

Then, in step S1020, the RX 102 transmits the second reference power information (5 W) to the TX 101. In step S1021, the TX 101 calculates the estimated value of the power loss based on the received power included in the first and second reference power information, and performs foreign object detection. The TX 101 also transmits an ACK in response to the second reference power information from the RX 102. Again, the TX 101 measures the Q factor here. Since the method is similar to that of steps S1010 to S1013, a description thereof will be omitted (steps S1022 to S1025). By the foregoing processing, the TX 101 and the RX 102 complete the calibration processing, and the charging of the RX 102 is started.

Now, processing in the case where the once determined GP is changed (re-determined) in the present exemplary embodiment will be described with reference to FIG. 10. For example, in step S1026, the TX 101 and the RX 102 perform device authentication processing. If the TX 101 and the RX 102 determine that each other's devices support higher GP, then in step S1027, the TX 101 and the RX 102 re-determine that the GP is 15 W. In steps S1028 to S1031, the RX 102 and the TX 101 perform re-calibration processing for increasing the power transmitted by the TX 101 to 15 W in a similar manner to in the processing of steps S1014 to S1017. The RX 102 also transmits a value of 15 W as third reference power information. The TX 101 transmits a response to the third reference power information to the RX 102. In the meantime, the TX 101 transmits an ACK with the additional time information, measures the Q factor based on the timing indicated by the time information, and performs foreign object detection (steps S1033 to S1038). The TX 101 checks that there is no foreign object, and starts power transmission for charging. As for step S1033, if the TX 101 is unable to respond to the third reference power information within a predetermined time, the TX 101 may transmit a power of 15 W while deferring the ACK transmission, or continue transmitting power up to a transmitted power of 5 W. Here, the TX 101 and the RX 102 may display a screen for causing the user to select whether to perform charging with 15 W or with 5 W on the respective output units 207 and 307. The user may operate the operation unit 208 or 308 to specify which to select. The user may operate the operation screen displayed on the output unit 207 or 307 for specification.

As described above, the TX 101 can prevent communication from being performed during the measurement of the Q factor by transmitting, for example, time information or the like as a signal for enabling the identification of the timing to measure the Q factor. The TX 101 may notify the RX 102 of the timing to measure the Q factor by using other configurations. For example, the TX 101 stores information for enabling the identification of the timing to measure the Q factor into a Power Transmitter Capability packet defined by the WPC standard as a packet for notifying the power reception apparatus of information about the capabilities of the power transmission apparatus. The TX 101 can notify the RX 102 of the timing to measure the Q factor by transmitting a packet containing the instruction information, the time information, and the like to the RX 102. As another example, to identify the timing to measure the Q factor, the RX 102 may request the TX 101 to transmit information for enabling the identification of the timing to measure the Q factor in the negotiation phase. In such a case, the TX 101 either transmits an acknowledgement (ACK), the time information, and the like to the RX 102 or transmits a negative acknowledgement (NAK) to the RX 102 in response to the request. As another example, the RX 102 may transmit time information and the like to the TX 101 to specify the timing for the TX 101 to measure the Q factor.

Third Exemplary Embodiment

The present exemplary embodiment deals with a configuration where a power reception apparatus 102 (RX 102) restricts communication by detecting the measurement of the Q factor by a power transmission apparatus 101 (TX 101). A detection unit 304 of the RX 102 detects that the TX 101 stops applying the voltage to measure the Q factor by measuring at least either a voltage or a current of a power reception coil 305. For example, the RX 102 measures the voltage of the power reception coil 305. If a drop in the voltage is detected, the RX 102 determines that the TX 101 is measuring the Q factor, and restricts communication until a predetermined time elapses. The predetermined time can be set in advance based on the duration needed to measure the Q factor, etc. With such a configuration, the RX 102 can stop communication while the TX 101 measures the Q factor.

Possible situations where the RX 102 detects a drop in the voltage of the power reception coil 305 include when the TX 101 is measuring the Q factor and when power transmission is ended because of an error such as a breakdown of the TX 101. If a drop in the voltage of the power reception coil 305 is detected, the RX 102 may therefore wait a predetermined time needed to measure the Q factor without communicating, and transmit a signal for requesting power transmission if power transmission is not resumed after the lapse of the predetermined time. The RX 102 can thus cope with a stop of power transmission in the event of a breakdown.

Other Exemplary Embodiments

The TX 101 according to the foregoing exemplary embodiments measures the Q factor based on a temporal change in the voltage in the power transmission coil 205. However, this method is not restrictive, and the Q factor can also be measured based on a temporal change in the current inside the power transmission coil 205. In such a case, the TX 101 measures a current value $A_3$ at time $T_3$ and a current value $A_4$ at time $T_4$, and calculates the Q factor based on Eq. 1, using the measured current values and the frequency of the high-frequency current.

Alternatively, the TX 101 may perform foreign object detection without calculating the Q factor. For example, in the case of FIG. 7B, the TX 101 measures the voltage values $A_3$ and $A_4$ at times $T_3$ and $T_4$ in the period where the application of the voltage to the power transmission coil 205 is stopped. Based on the measurements, the TX 101 determines whether there is a foreign object based on the difference (gradient) in the voltage value in the period from time $T_3$ to time $T_4$. If there is a foreign object within the coverage of power transmission, the voltage value of the power transmission coil 205 is expected to attenuate more than without a foreign object. The TX 101 therefore determines that there is a foreign object if the difference (gradient) between the measured voltages is greater than a reference value (difference between the voltages at the two times) obtained without a foreign object by a certain amount or more. Alternatively, the TX 101 can also detect a foreign object by determining the ratio between the voltage values $A_3$ and $A_4$. For example, if the ratio of the voltage $A_3$ at time $T_3$ to the voltage $A_4$ at time $T_4$ is higher than a reference value (the ratio of the voltages at the two times) obtained without a foreign object by a certain level or more, the TX 101 determines that there is a foreign object.

If foreign object detection is performed as described above without calculating the Q factor, the calculated difference and ratio between the voltages can vary depending on the magnitude of the voltage applied to the power transmission coil 205 and the timing of the voltage measurement. The foreign object detection can thus be performed with higher reliability by adjusting the magnitude of the voltage and the timing of the voltage measurement to the condition when the reference values are obtained.

The TX 101 according to the foregoing exemplary embodiments measures at least either the voltage or the current output from the power transmission coil 205, and performs foreign object detection based on the measurement. However, this is not restrictive. For example, another device connected outside the TX 101 may be configured to measure and calculate the voltage, current, and power output from the power transmission coil 205, energy stored in a capacitor in the TX 101, and the like, and provide the obtained values to the TX 101. The TX 101 can perform foreign object detection based on the values provided by another device.

The TX 101 according to the foregoing exemplary embodiments is configured to stop the application of the voltage to the power transmission coil 205 by changing the switch in the power transmission unit 203 to disconnect the connection with the power transmission coil 205 when measuring the Q factor. However, this is not restrictive. For example, the power transmission unit 203 may stop the application of the voltage by setting the transmission voltage to 0 in measuring the Q factor. Alternatively, the TX 101 may be configured to switch to a lower voltage value instead of completely setting the transmission voltage to 0 when measuring the Q factor. Since the method for measuring the Q factor according to the present exemplary embodiment is to calculate the Q factor based on the degree of attenuation of the voltage value, the Q factor can be measured without completely stopping the application of the voltage by reducing the voltage to a voltage value where at least the attenuation of the voltage value can be observed. Here, if the voltage-reducing period exceeds a certain time, the RX 102 can determine that an error has occurred in the TX 101. The amount of reduction in the voltage value is therefore desirably set so that the attenuation of the voltage can be measured within a period where the TX 101 is not determined to be malfunctioning by the RX 102.

The TX 101 according to the foregoing exemplary embodiments performs foreign object detection by stopping the voltage and measuring the Q factor. However, in any of the exemplary embodiments, the RX 102 can determine that an error has occurred in the TX 101 from the stop of the voltage. In view of this, a method for solving the foregoing issue by the RX 102 obtaining information about the TX 101 when the RX 102 is placed within the coverage of power transmission of the TX 101 will be described.

The RX 102 transmits a signal for giving an instruction to transmit information about the TX 101 to the TX 101 by communication in the negotiation phase, for example. The information about the TX 101 includes version information about the TX 101, information about the standard or standards with which the TX 101 is compliant, and information about a foreign object detection method used by the TX 101. The TX 101 transmits the information about the TX 101 to the RX 102. The RX 102 recognizes that the TX 101 stops the voltage for a predetermined period for the sake of measuring the Q factor, based on the obtained information. The RX 102 is thereby prevented from erroneously determining that an error has occurred in the TX 101 when the TX 101 stops the application of the voltage to measure the Q factor, and can continue stable charging processing. Moreover, if, for example, the TX 101 transmits the information for enabling the identification of the timing to measure the Q factor as in the second exemplary embodiment, the RX 102 can appropriately restrict communication by sharing the information format.

The present disclosure is not limited to the above embodiments and various changes and modifications can be made within the spirit and scope of the present disclosure. Therefore, to apprise the public of the scope of the present disclosure, the following claims are made.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, a drop in the detection accuracy can be prevented in the case where the foreign object detection is performed based on the measurement of the voltage or current in the period where the power transfer is stopped.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmission apparatus comprising:
a coil; and
one or more processors is configured to:
wirelessly perform communication with a power reception apparatus using the coil;
wirelessly transfer power to the power reception apparatus using the coil;
perform measurement of at least either a voltage or a current output from the coil in a period where transferring the power is stopped and the communication is not performed;
determine that there is an object different from the power reception apparatus based on a result of the measurement; and
restrict transfer of the power, based on a determination that there is the object different from the power reception apparatus,
wherein the voltage output from the coil is measured at a first timing in the period where transferring the power is stopped and the communication is not performed and at a second timing after the first timing in the period, and
wherein it is determined that there is the object different from the power reception apparatus, based on the first timing, the second timing, a measurement value of the voltage output from the coil based on the first timing, and a measurement value of the voltage output from the coil based on the second timing.

2. The power transmission apparatus according to claim 1, wherein the period where the communication is not performed is one defined by a Wireless Power Consortium (WPC) standard where the power reception apparatus must not transmit a signal.

3. The power transmission apparatus according to claim 2, wherein the period where the communication is not performed is one defined by the WPC standard where the power reception apparatus must not transmit a next signal after transmission of a signal until a lapse of a predetermined time.

4. The power transmission apparatus according to claim 2, wherein the period where the communication is not performed is one defined by the WPC standard where the power reception apparatus must not transmit a next signal after the power reception apparatus receives a signal from the power transmission apparatus until a lapse of a predetermined time.

5. The power transmission apparatus according to claim 1, wherein the period where the communication is not performed is one until a next signal transmitted from the power reception apparatus is received after reception of a signal transmitted from the power reception apparatus.

6. The power transmission apparatus according to claim 1,
wherein a signal for restricting signal transmission to the power transmission apparatus is transmitted to the power reception apparatus, and
wherein the measurement is performed after the signal for restricting the signal transmission to the power transmission apparatus is transmitted.

7. The power transmission apparatus according to claim 1,
wherein a signal capable of identifying timing for performing the measurement is transmitted to the power reception apparatus, and
wherein the measurement is performed based on the timing.

8. The power transmission apparatus according to claim 1, wherein it is determined that there is the object different from the power reception apparatus based on a duration from the first timing to the second timing and a ratio of the measurement value based on the first timing to the measurement value based on the second timing.

9. A power transmission apparatus comprising:
a coil; and
one or more processors is configured to:
wirelessly perform communication with a power reception apparatus using the coil;
wirelessly transfer power to the power reception apparatus using the coil;
perform measurement of at least either a voltage or a current output from the coil in a period where transferring the power is stopped and the communication is not performed;
determine that there is an object different from the power reception apparatus based on a result of the measurement; and
restrict transfer of the power in a case where there is the object different from the power reception apparatus,
wherein the current output from the coil is measured at a first timing in the period where transferring the power is stopped and the communication is not performed and at a second timing after the first timing in the period, and
wherein it is determined that there is the object different from the power reception apparatus, based on the first timing, the second timing, a measurement value of the current output from the coil based on the first timing, and a measurement value of the current output from the coil based on the second timing.

10. A control method of a power transmission apparatus, comprising:
wirelessly performing communication with a power reception apparatus using a coil;
power transmission of wirelessly transferring power to the power reception apparatus using the coil;
performing measurement of at least either a voltage or a current output from the coil in a period where the power transmission stops transferring the power and the communication is not performed;
determining that there is an object different from the power reception apparatus based on a measurement result of the measurement; and
restricting transfer of the power, that the object different from the power reception apparatus,
wherein the voltage output from the coil is measured at a first timing in the period where transferring the power is stopped and the communication is not performed and at a second timing after the first timing in the period, and
wherein it is determined that there is the object different from the power reception apparatus, based on the first timing, the second timing, a measurement value of the voltage output from the coil based on the first timing, and a measurement value of the voltage output from the coil based on the second timing.

* * * * *